United States Patent [19]

Rusch et al.

[11] Patent Number: 5,772,823
[45] Date of Patent: Jun. 30, 1998

[54] METHOD FOR INSTALLING AUTOMOTIVE WINDSHIELDS

[75] Inventors: Bradd R. Rusch, Janesville; Jeffrey L. Ritchie, Fond du Lac, both of Wis.

[73] Assignee: Auto Glass Specialists, Inc., Madison, Wis.

[21] Appl. No.: 874,019

[22] Filed: Jun. 12, 1997

Related U.S. Application Data

[62] Division of Ser. No. 586,383, Jan. 16, 1996, Pat. No. 5,639,134.

[51] Int. Cl.⁶ .................................. B25J 15/06; B60J 1/00
[52] U.S. Cl. ........................... 156/108; 156/71; 156/94; 156/98; 156/285; 156/538; 294/15; 294/64.1
[58] Field of Search ........................... 156/108, 71, 94, 156/98, 285, 538; 294/15, 64.1; 29/270

[56] References Cited

U.S. PATENT DOCUMENTS

| | | |
|---|---|---|
| 1,267,270 | 5/1918 | Rheinlander . |
| 1,705,221 | 3/1929 | Jones . |
| 2,127,154 | 8/1938 | Burk . |
| 2,131,687 | 9/1938 | Kaplan . |
| 2,147,907 | 2/1939 | MacChesney . |
| 2,212,755 | 8/1940 | Solomon . |
| 2,303,393 | 12/1942 | Schmidt . |
| 2,484,531 | 10/1949 | Simmons . |
| 2,558,479 | 6/1951 | Miller . |
| 2,620,217 | 12/1952 | Lenhart . |
| 2,807,029 | 9/1957 | Armstrong . |
| 2,871,054 | 1/1959 | Zinke . |
| 3,240,525 | 3/1966 | Wood . |
| 3,831,991 | 8/1974 | Lukeman . |
| 3,913,964 | 10/1975 | Lukeman . |
| 4,597,727 | 7/1986 | Birkhauser, III . |
| 4,681,520 | 7/1987 | Birkhauser, III . |
| 4,932,701 | 6/1990 | Corniellier et al. . |
| 5,069,012 | 12/1991 | Riederer . |
| 5,184,858 | 2/1993 | Arai . |
| 5,330,597 | 7/1994 | Leuchten et al. ........................ 156/108 |

*Primary Examiner*—Michael W. Ball
*Assistant Examiner*—Sam Chuan Yao
*Attorney, Agent, or Firm*—Lathrop & Clark

[57] ABSTRACT

For replacement of automotive windshields by aftermarket installers, two mirror image grips have a curved tubular handle which is welded to a sheet metal base with two legs which are at an obtuse angle to one another. The curved handle allows smooth repositioning of an installer's hands as the large windshield is shifted into position on the automobile, the obtuse angle base provides sufficient clearance for the full range of hand positions. Each leg of the sheet metal base is positioned to abut against an installer's hand during different stages of windshield lifting, i.e. when the windshield is vertical, and when it is inverted and horizontal. The grips are used to lift and position a windshield with a bead of urethane thereon into the pinch weld of the automobile.

3 Claims, 2 Drawing Sheets

METHOD FOR INSTALLING AUTOMOTIVE WINDSHIELDS

This application is a division of application Ser. No. 08/586,383, filed Jan. 16, 1996, now U.S. Pat. No. 5,639, 134.

FIELD OF THE INVENTION

The present invention relates to suction cup grip assemblies in general, and in particular to apparatus for engaging and gripping automobile windshields for removal and replacement.

BACKGROUND OF THE INVENTION

Much attention is paid in automobile design and manufacture to provide automobile windshields which provide good visibility and field of view to the driver, while at the same time contributing to the attractive appearance of the automobile. Modern automotive designs tend toward the curvaceous, and windshields have reflected this trend, utilizing compound curves in a single wide pane. Although automobile windshields are durable and subject to very little degradation from erosion or corrosion, impacts from road debris, tree branches, or minor or major collisions can crack or rupture the windshield. Small cracks may be repaired with is sealant or crack fillers. Larger cracks, however, require replacement of the entire windshield as a unit.

Windshield replacement is undertaken by installers throughout the country. Because it is considered an infraction of traffic codes in many localities to operate a vehicle with a severely damaged windshield, most windshield replacements are made in close vicinity to the scene of windshield damage. Often installers in mobile vans will bring the replacement windshield to the damaged car, and will remove the damaged windshield and install a new one while the car is parked on the street.

There is thus a premium placed on making windshield installation a task which may be accomplished by a single installer with limited equipment.

Suction cup grips have long been used for engaging and moving large sheets of glass. Suction handles for planar plate glass typically have two suction cups with a straight bar between them. These handles permit one installer, or two when the glass sheet is especially large, to lift, position, and install a sheet of flat glass. However, automobile windshield installation presents demands not encountered by plate glass installers. Because the automobile hood in nearly all cases extends frontwardly from beneath the windshield, access to the glass opening is much more difficult. To reach the opening an installer, while still supporting the windshield, must bend forward over the hood.

In one common mode of installation, a urethane bead of insulation and adhesive is extruded along the pinchweld defining the windshield surround, and the windshield is positioned thereon. In this method, installers have tended to grip the windshield directly. Commonly, aftermarket windshield installation has been accomplished by an installer who grips the windshield directly, applies one edge of the windshield to the adhesive bead in the pinch weld, and then releases the windshield and presses it into place. This mode of installation, however, leaves open the possibility that a tight seal with the glass will not be obtained at all points. Applying sealant directly to the windshield would provide an effective seal, but would no longer allow an installer to grip the windshield directly with his fingers. When handling automobile windshields weighing 50–60 pounds, an installer must be able to maneuver the glass at various different angles and orientations, requiring constant repositioning of the grips as the position of the installer changes.

What is needed is a device which will allow an automobile windshield installer to securely and adjustably grip the windshield, while allowing adhesive to be applied around the rear of the windshield and thereby allowing effective installation of the windshield in a safe and convenient manner.

SUMMARY OF THE INVENTION

The windshield attachment apparatus of this invention includes two gripping apparatus for handling windshields during replacement of an automobile's windshield. The apparatus has two mirror image hand grips, each with a suction cup for attachment to the windshield. A vacuum pump is connected to the suction cup, and may be manually worked to withdraw air from between the suction cup and the windshield. A handle member has a bottom plate that is connected to the suction cup, and an arched portion that is fitted around and positions the vacuum pump. A flange plate extends from the handle member bottom plate at an angle greater than 90°, preferably about 100°. A tubular hand grip is positioned over the vacuum pump and extends between the support plate and the flange plate. The tubular handle is curved to allow the operator's hand to be shifted and oriented comfortably in a variety of positions without interference during the installation of an automobile windshield. The flange plate allows an installer's hand to abut for application of lifting forces when the windshield is vertical. The support plate allows an installer's hand to abut for lifting when the windshield is inverted and horizontal. By using the surface mounting grips of this invention, an adhesive and insulative bead may be applied directly to the windshield, rather than to the automobile pinchweld, and thus an improved seal may be obtained.

It is a feature of the present invention to provide a winshield lifting grip which transfers lifting loads comfortably to an installer's hand when lifting both a horizontal and a vertical windshield.

It is a further feature of the present invention to provide a windshield installation tool which will permit an installer to replicate factory quality installation of windshields by enabling the installer to place urethane directly on the windshield during installation.

It is another feature of the present invention to provide a gripping assembly that allows the operator to constantly and comfortably reposition the placement of his hands during installation of windshields.

It is also a feature of the present invention to provide a compact windshield grip which fully accommodates the hands of an installer.

Further objects, features and advantages of the invention will be apparent from the following detailed description when taken in conjunction with the accompanying drawings.

DESCRIPTION OF THE PREFERRED EMBODIMENT

Figure 1:
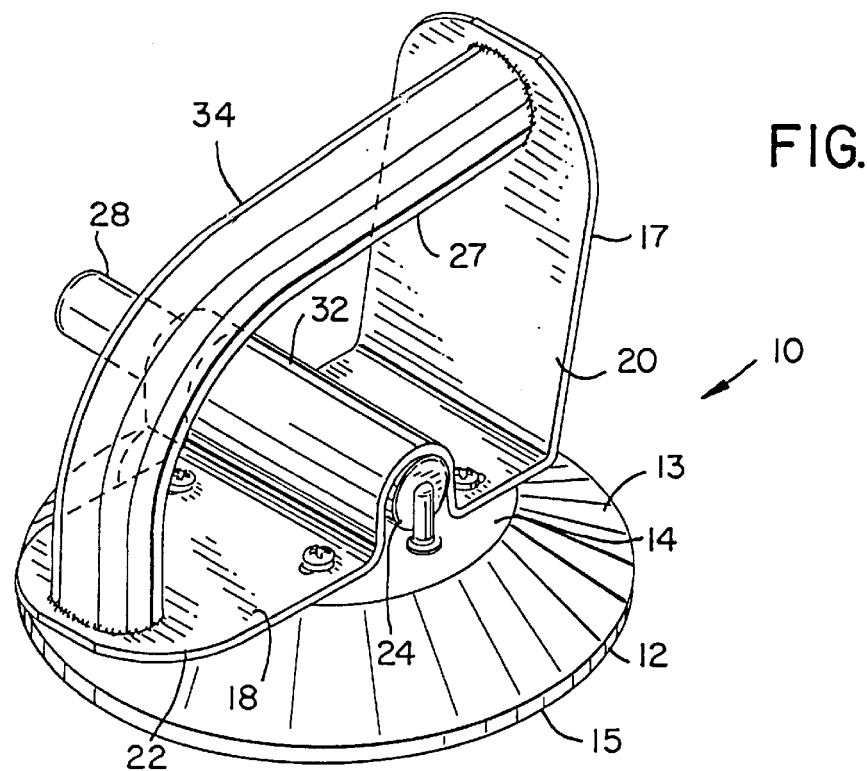
FIG. 1 is an isometric view of a right-hand windshield glass installation grip of the invention.
Figure 5:
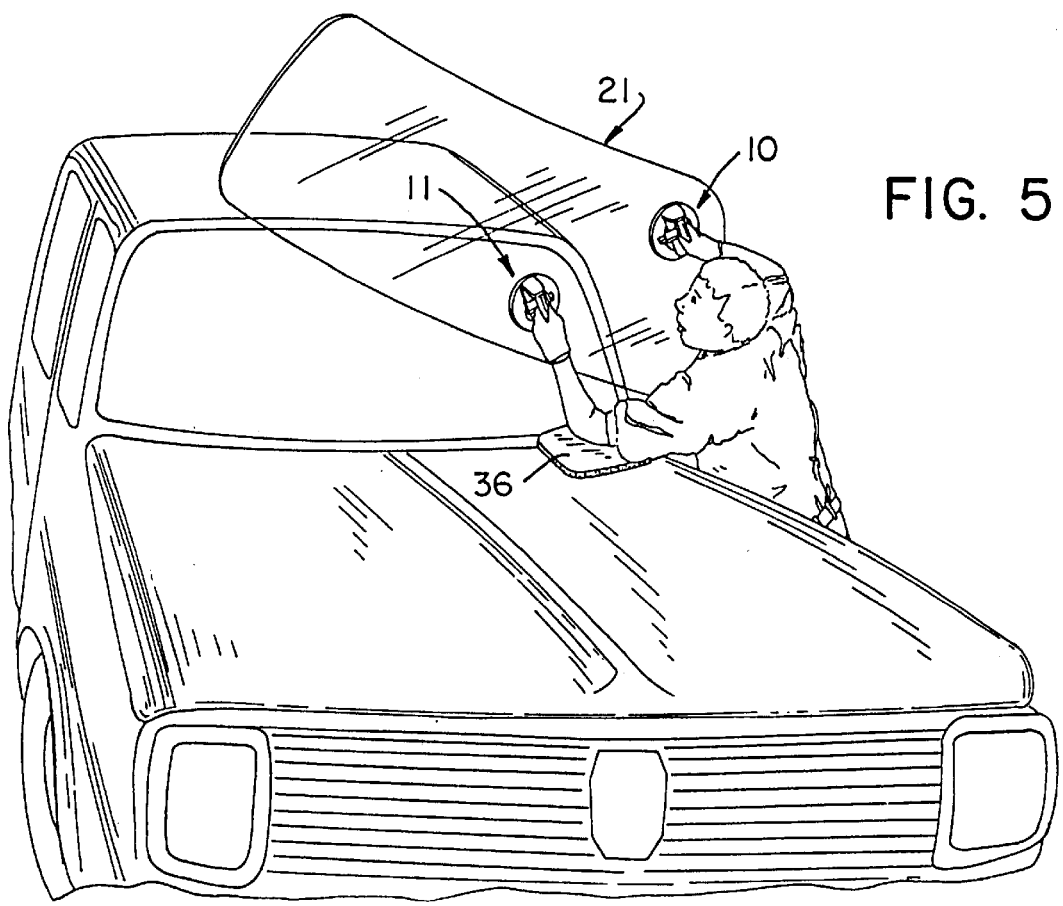
FIG. 5 is a perspective view of a technician installing a windshield using the grips of FIGS. 2 and 3.
Figure 2:
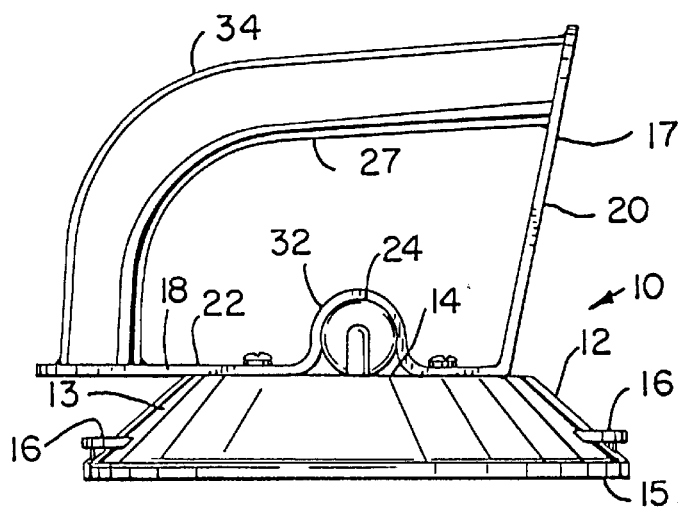
FIG. 2 is a side view of the grip of FIG. 1.
Figure 3:
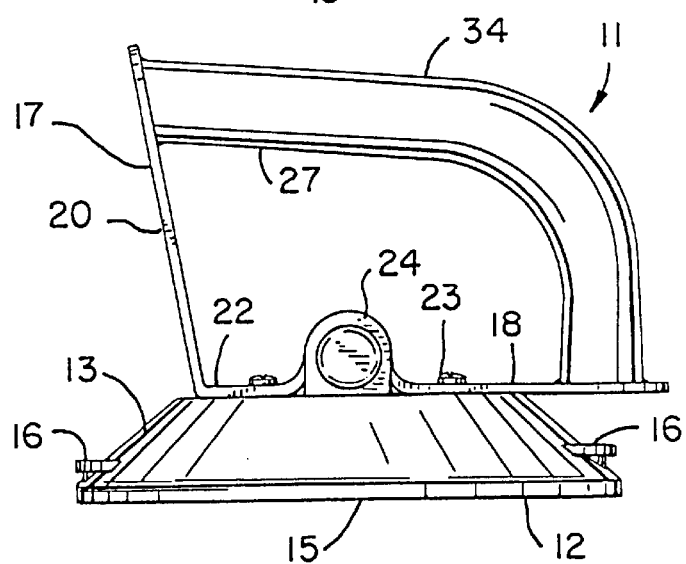
FIG. 3 is a side view of a left-hand grip of this invention.
Figure 4:
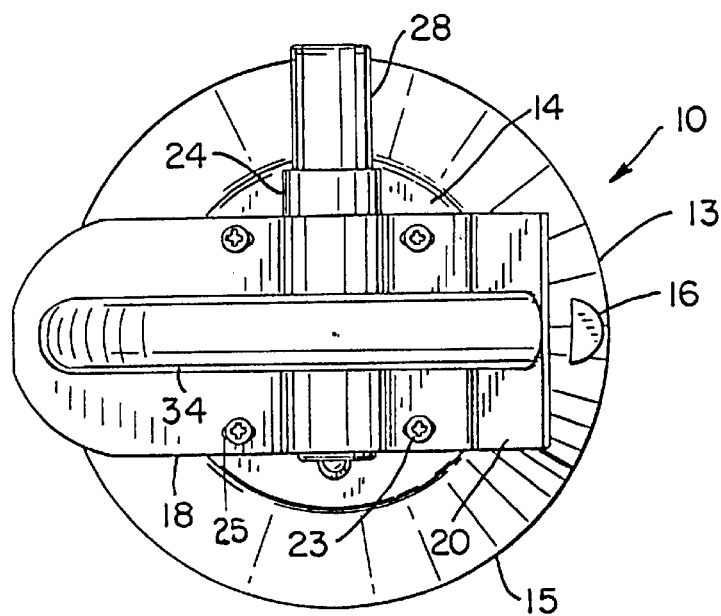
FIG. 4 is a top view of the grip of FIG. 1.

Referring more particularly to FIGS. 1–5, wherein like numbers refer to similar parts, windshield glass installation grips 10, 11 for gripping an automobile windshield 21 are shown in FIGS. 2 and 3. Two mirror-image grips are provided for installation of a windshield, a right-hand grip 10, shown in FIGS. 1 and 2, and a left-hand grip 11, shown in FIG. 3. Each grip 10, 11, has a resilient suction cup 12 which is attached to a rigid handle assembly 18 with a connected manual vacuum pump 24. The two grips 10, 11, are identical except for the positioning of the actuation piston 28 of the vacuum pump 24. In each case, the piston 28 is positioned to be operated by an installer's thumb while the fingers engage the grip. The further detailed description of the right-hand grip 10 also applies to the left-hand grip 11.

The suction cup 12 has an upper attachment wall 14 and a downwardly opening concave skirt 13 having an edge 15 that forms a vacuum seal with the surface of a windshield 21. The suction cup 12 preferably has at least one flexible tab 16, shown in FIG. 2, which extends outwardly from the skirt 13 above the edge 15 to assist in breaking the vacuum seal and removing the installation grip 10 from the surface of a windshield. An exemplary suction cup and manual vacuum pump are those available from Wood's Powr-Grip Co., Inc. of Laurel, Mont., under model number TL6.

The handle assembly 18 is comprised of bent steel plate handle member 17 which is welded to a steel tubular handle 34. The handle member 17 is bent into two sections, a support plate 22, and a flange plate 20. The suction cup 12 is connected to the support plate 22 of the handle member 17, as shown in FIGS. 1 and 2. The support plate 22 extends generally parallel to the suction cup attachment wall 14, and is held in place with respect to the suction cup 12 by four screws 23. The screws 23 extend through slots 25 to accommodate some dimensional variations in the connected parts. The flange plate 20 extends upwardly from the support plate 22 at an angle of greater than about 90°. In a preferred embodiment, this angle is approximately 100°. The obtuse angle of the flange plate 20 gives increased space for an installer's fingers between the flange plate 20 and the curved tubular handle 34 which extends between the support plate 22 and the flange plate 20. For improved gripping, the tubular handle 34 is preferably formed of tubing which is at least one inch in diameter.

A volume 27 is defined between the handle 34 and the handle member 17 into which an installer's fingers may extend. As shown in FIG. 1, the manual vacuum pump 24 is attached to the attachment wall 14 of the suction cup 12. The vacuum pump 24 is formed with a suction hole, not shown, through the suction cup 12, for removing air from the suction cup 12 when it is placed against the surface of a windshield 21. A piston 28 is attached to the vacuum pump 24 and projects out through a sideways opening of the vacuum pump 24. By pumping the piston 28 in and out the air from within the suction cup is exhausted, with the result that the atmospheric pressure exceeds the pressure within the cup 12, and the grip is thereby held in place on the windshield.

As shown in FIG. 2, the handle member 17 support plate 22 has an arched portion 32 that is fitted around and positions the vacuum pump 24. The arched portion 32 allows the vacuum pump 24 to be positioned in close proximity to the attachment wall 14 of the suction cup 12, thereby helping to insure a proper seal between the vacuum pump 24 and the suction cup 12. The curved, tubular handle 34 extends over the vacuum pump 24 from the flange plate 20 of the handle member 17 to the support plate 22. The hand grip 34 is shaped so that the installer may easily reposition the orientation of his grip.

The installation grips 10, 11 of this invention enable the installation of A automobile windshields in a fashion which more nearly duplicates the appearance and function of a factory installed windshield. In prior art after market installation techniques, a urethane bead of caulk or sealant was placed on the pinchweld forming the windshield surround frame. Due to the variations inherent in metal assembly techniques, the vehicle pinch weld is invariably uneven, making it difficult to obtain a smooth and continuously adhered bead of sealant. A constant bead is important both to prevent water infiltration into the vehicle through the windshield/frame seam, and to reduce the amount of outside noise which can enter the vehicle. Furthermore, holding the windshield directly by its edges, and positioning it in a single step would often result in deformation of the pinch weld bead of sealant in undesirable ways.

Using the grips 10, 11 of this invention, an installer would first position the grips on a windshield 21, one grip close to the installer, and one about half way across the windshield. Pumping the manual vacuum pumps, the suction cups are then caused to adhere to the smooth surface of the windshield. Taking the grips in hand, the windshield is inverted and positioned on a supporting surface, for example two saw horses. The rear surface of the windshield is then ready for application of the urethane sealant bead. Preferably starting along a side of the windshield, to avoid any break in the line of caulk along the top of the windshield, the urethane is applied in a continuous bead. If two applications of urethane are required to encircle the windshield, the joint between the two beads is made as seamless as possible.

When installing the windshield with the applied sealant bead, a pad 36 is positioned on the hood of the vehicle on which the installer places his elbow during placement of the windshield into the pinch weld of the automobile. The pad 36 is used as a pivot point on the hood of an automobile. The windshield is adjusted in position with the load carried primarily on the vehicle hood through the pad, and thus without denting the hood. At the same time, excess strain on the installer's back is avoided, by removing a portion of the load. The pad 36 allows the operator to approach the vehicle in a more controlled and comfortable manner by enabling him to pause and review the layout of the windshield with respect to the frame while the windshield is supported on the hood of the automobile through his elbow. The installer may coordinate the position of the windshield with any guide marks he may wish to place on the frame, and then bring the windshield into engagement with the pinch weld in a motion which runs nearly perpendicular to the pinch weld all around the windshield, thereby achieving a consistent bead seam between the windshield and the automobile.

By placing the urethane directly on the glass and using the window glass installation grips and pad, the installer has more control when dropping and centering the window in place. This control eliminates the guesswork associated with determining where the urethane has been placed in the pinch weld. By placing the urethane bead on the window in a v-seal that is tapered toward the body of the vehicle, the narrow portion of the bead makes contact with the pinch weld. By being able to adjust his grip in the handle of the installation grips 10, 11, and by using the pad as a pivot point, the installer is able to easily center the windshield and allow the urethane to make contact with the automobile body at the proper angle for a seal which more nearly matches OEM specifications.

Each portion of the handle assembly 18 is configured to suit the requirements of the installer at some point in the installation process. When lifting the windshield vertically off a support, for example when removing it from the sawhorses, the installer's fingers are gripped along the portion of the curved tubular handle which is generally parallel to the support plate. However, as the installer pivots the windshield to change its orientation from lying in a horizontal plane to lying in a generally vertical plane, his hands mover along the tubular handle 34 to abut the flange plate 20. Abutted against the flange plate 20, the user's hand can apply a solid lifting force. Yet because the flange plate is positioned at 100° to the support plate 22, it tends to retain the installers fingers around the handle 34, rather than allowing them to move forward under the weight of the windshield 21. In setting the windshield on the saw horse supports prior to applying the urethane bead, the installer also makes use of the curved section of the tubular handle 34 where it abuts the support plate 20. In setting the windshield down in a horizontal orientation, the installer must invert his grip, and his fingers will then abut against the support plate 20 with the load of the windshield then being above the grips 10, 11, pressing down.

It should be understood that, although the grip of this invention has been shown as formed of a steel plate, aluminum, plastic or other material of sufficient strength may also be employed.

It is understood that the invention is not limited to the particular construction and arrangement of parts herein illustrated and described, but embraces such modified forms thereof as come within the scope of the following claims.

We claim:

1. A method for installing an automobile windshield, comprising the steps of:
    a) engaging a first and a second suction grip with a windshield to be installed, each grip having a single resilient suction cup having an edge for forming an air tight seal with an automobile windshield, a means for extracting the air from between the suction cup and an engaged automobile windshield to thereby form a differential pressure seal between the cup and the windshield, a rigid handle member to which the suction cup is fixed, wherein the handle member has a support plate which extends generally parallel to the cup, and a flange plate which extends upwardly from the cup, wherein the angle defined between the support plate and the flange plate is greater than 90°, and a curved tubular handle which extends from the support plate to the flange plate, wherein a volume is defined between the handle and the handle member for the reception therein of the fingers of an installer, and the curvature of the handle thereby permits the repositioning of the fingers of an installer along the handle as the orientation of the device changes with the position of the automobile windshield with respect to the body of the installer in the course of the installation of the windshield;
    b) lifting the engaged windshield, and inverting the windshield so that the grips are beneath the windshield in such a manner that the one lifting may engage his hands against the support plates of the grips;
    c) applying a bead of sealant around the perimeter of the inverted windshield;
    d) lifting the windshield with the sealant applied thereto by the connected grips, and altering the orientation of the grips with respect to an installer to bring the windshield into a generally vertical orientation in such a manner that one lifting may engage his hands against the flange plates of the grips;
    e) bringing the generally vertical windshield into engagement with the windshield frame of an automobile to thereby connect the windshield to the automobile; and
    f) releasing the grips from engagement with the windshield.

2. The method of claim 1 wherein the step of bringing the windshield into engagement with the windshield frame of an automobile includes the step of bracing the elbow of the installer on a supportive pad positioned on the hood of the automobile below the windshield frame.

3. A method for removing an automobile windshield and installing a replacement automobile windshield, comprising the steps of:
    a) removing the windshield from an automobile to expose a windshield frame;
    b) engaging a first and a second suction grip with a replacement windshield to be installed by applying a single resilient suction cup and the windshield; to form an air tight seal between each suction cup and the windshield;
    c) extracting air from between each applied suction cup and the engaged automobile windshield to thereby form a differential pressure seal between each cup and the windshield.
    d) lifting the engaged windshield by gripping a rigid handle member connected to each grip, each handle member having a support plate which extends generally parallel to the engaged windshield, and a flange plate which extends upwardly from the support plate, wherein the angle defined between the support plate and the flange plate is greater than about 90°, and a curved tubular handle extends between and connects the support plate to the flange plate;
    e) inverting the lifted windshield so that the grips are beneath the windshield in such a manner that the one lifting may engage his hands against the support plates of the grips;
    f) positioning the inverted windshield on a support;
    g) applying a continuous bead of sealant around the perimeter of the supported inverted windshield to avoid any break in the bead along the top of the windshield;
    h) lifting the windshield with the sealant applied thereto by the connected grips, wherein a volume is defined between the handle and the handle member into which the fingers of an installer extend, and the handle is curved to permit the repositioning of the fingers of the installer along the handle as the orientation of the grips change with the position of the automobile windshield with respect to the body of the installer in the course of the installation of the windshield;
    I) altering the orientation of the grips on the lifted windshield with respect to the installer to bring the windshield into a generally vertical orientation in such a manner that the one lifting engages his hands against the flange plates of the grips;
    j) bringing the generally vertical windshield into engagement with the windshield frame of an automobile to thereby connect the windshield to the automobile; and
    k) releasing the grips from engagement with the windshield.

* * * * *